(12) United States Patent
Stence, Jr.

(10) Patent No.: US 7,114,461 B2
(45) Date of Patent: Oct. 3, 2006

(54) METHOD FOR RAISING AQUATIC ANIMALS

(75) Inventor: Henry D. Stence, Jr., Lubec, ME (US)

(73) Assignee: Winterlab Limited, New York, NY (US)

( * ) Notice: Subject to any disclaimer, the term of this patent is extended or adjusted under 35 U.S.C. 154(b) by 0 days.

(21) Appl. No.: 10/951,368

(22) Filed: Sep. 28, 2004

(65) Prior Publication Data

US 2006/0065204 A1 Mar. 30, 2006

(51) Int. Cl.
*A01K 61/00* (2006.01)

(52) U.S. Cl. .................. 119/234; 119/238; 119/200; 119/204; 119/207; 119/208; 119/221

(58) Field of Classification Search .............. 119/221, 119/234–241, 207, 211, 245–249; 210/166; 405/25, 29; 4/489, 513

See application file for complete search history.

(56) References Cited

U.S. PATENT DOCUMENTS

| | | | |
|---|---|---|---|
| 3,495,573 A * | 2/1970 | Vanderborgh, Jr. et al. . | 119/238 |
| 4,007,709 A * | 2/1977 | Wishner ..................... | 119/210 |
| 4,080,930 A | 3/1978 | Pruder et al. | |
| 4,212,268 A * | 7/1980 | Chapman .................... | 119/210 |
| 4,226,210 A * | 10/1980 | Lockwood et al. ......... | 119/236 |
| 4,931,291 A | 6/1990 | Kojima et al. | |
| 4,947,791 A * | 8/1990 | Laier et al. ................. | 119/221 |
| 5,121,708 A | 6/1992 | Nuttle | |
| 5,144,907 A | 9/1992 | Dabinett | |
| 5,158,788 A | 10/1992 | Lavens et al. | |
| 5,201,136 A * | 4/1993 | LaMorte et al. ............ | 43/4 |
| 5,353,745 A * | 10/1994 | Fahs, II ...................... | 119/226 |
| 5,567,221 A | 10/1996 | Larson et al. | |
| 5,637,333 A | 6/1997 | Lawrence et al. | |
| 5,778,823 A | 7/1998 | Adey et al. | |
| 5,908,622 A | 6/1999 | Barclay | |
| 6,309,714 B1 * | 10/2001 | Gaither ........................ | 428/13 |
| 6,615,767 B1 * | 9/2003 | Untermeyer et al. ........ | 119/215 |

FOREIGN PATENT DOCUMENTS

| | | |
|---|---|---|
| JP | 54-004766 | 1/1979 |
| JP | 06-098691 | 4/1994 |
| JP | 07-231734 | 9/1995 |

OTHER PUBLICATIONS

Devin et al., Development of Grow-Out Techniques for Juvenile Sea Urchins *Strongylocentrotus droebachiensis*, in *Proceedings of the International Conference on Sea Urchin Fisheries and Aquaculture 2003*, J. Lawrence, Ed., DEStech Publications, Inc. pp. 246-254.

* cited by examiner

Primary Examiner—Teri Pham Luu
Assistant Examiner—Joshua Michener
(74) Attorney, Agent, or Firm—Cohen, Pontani, Lieberman & Pavane

(57) ABSTRACT

A method of culturing aquatic animals utilizes a habitat including at least one habitat unit, each habitat unit being constructed of a plurality of concentric tubes with a fixed radial spacing. The habitat is immersed in an aquatic environment containing larvae of aquatic animals to be raised so that the larvae settle on the habitat, the aquatic animals are fed until the animals grow to a desired size, and the cultured animals are then harvested.

17 Claims, 2 Drawing Sheets

METHOD FOR RAISING AQUATIC ANIMALS

BACKGROUND OF THE INVENTION

1. Field of the Invention

This invention relates to a method for raising small marine echinoderms and bivalve mollusks which need to settle on a substrate to develop into juveniles and ultimately into adults, and particularly to a method for culturing sea urchins from settling to maturity or any stage from metamorphosis to market.

2. Description of the Related Art

The increasing demand for aquatic animals including echinoderms and mollusks as a source of food, as well as concerns regarding over-harvesting and potential contamination from pollution, have led to the growth and expansion of the aquaculture industry.

Echinoderms include starfishes, sea urchins, and sea cucumbers, having an internal calcareous skeleton and often covered with spines. Bivalve mollusks include oysters, clams, scallops, and mussels, having a shell consisting of two hinged valves. Spawning of mature marine animals results first in the development of the embryo. The embryo develops to a larval stage. Initially, the larvae are free swimming. After a time, the larvae metamorphose into a juvenile stage, and are capable of crawling and attaching to a substrate. After settling on a substrate, the juveniles are allowed to develop and are finally harvested when they reach a suitable size.

The juvenile stage of the green sea urchin may be broken up in four stages, i.e. post-metamorphosis, neo-juvenile, early juvenile and juvenile. The post-metamorphosis stage initiates immediately following metamorphosis and lasts until the development of the mouth is complete and feeding can commence (5–14 days). During the neo-juvenile stage, the individuals have a fully developed mouth but graze primarily on benthic diatoms and bacteria (about 30 days). In the early juvenile stage, the sea urchins have a diameter range of 1–15 mm and are able to consume macroalgae such as kelp, as well as mussels and other food sources. During the juvenile stage, the sea urchins have a diameter of over 15 mm, but have not reached sexual maturity. For additional details, see Devin et al., Development of Grow-Out Techniques for Juvenile Sea Urchins *Strongylocentrotus droebachiensis*, in *Proceedings of the International Conference on Sea Urchin Fisheries and Aquaculture* 2003, J. Lawrence, Ed., DEStech Publications, Inc. pp. 246–254.

Currently available aquaculture systems are generally classified as open or closed. Open systems are typically created by building a net-pen in a body of water, such as a bay, a lake or stream. Closed systems generally recirculate the water in a closed tank, the water being pumped from the tank through a treatment cycle and back into the tank.

For both open and closed aquaculture systems, the yield of harvested aquatic animals is always a significant factor impacting the commercial viability and profitability of farming. Thus, methods which produce commercially viable numbers of aquatic animals have been developed.

U.S. Pat. No. 4,080,930 discloses a method of rearing commercially desirable bivalve mollusks such as oysters, clams, mussels, and scallops under artificial conditions to any marketable size in substantially reduced time periods. Oyster spat (<0.5 mm) produced by known means are placed in growing tanks and fed at certain regular times, with certain species of algae in unusually large quantities, at unusually high algal cell concentrations, and maintained at unusually high temperatures until oysters reach the desired size. The tanks and oysters are meticulously cleansed and seawater or other source of salts and minerals is added at regular times during the rearing period.

U.S. Pat. No. 4,931,291 endeavors to achieve high yield of crustaceans and shellfishes to be cultivated, by employing unicellular algae whose cells are disrupted as the feeds for larvae.

U.S. Pat. No. 5,144,907 discloses a method of culturing giant scallops from the egg stage to the juvenile stage under controlled conditions, involving, as essential steps: after a pre-selected period of time of growing larvae in deep larval tanks, allowing the larvae to settle on bottom of the larval tanks in pre-selected lighting conditions and become spat, while periodically changing the water in the tanks and feeding the larvae with food; after a pre-selected period of time, brushing the spat out of the larval tanks, catching the brushed-out spat on screen trays; placing the spat contained on the screen trays in a culturing tank of selected water with the screen trays being stacked vertically therein; and periodically changing the water in the culturing tanks by inflow/outflow of water and monitoring food levels in the culturing tanks.

In order to produce high yields of aquatic animals, these methods attempt to establish optimum conditions related to the quality and quantity of food, feeding methods, temperature, and water. However, none of the methods proposes an inexpensive, durable and efficient habitat for economically producing commercially viable numbers of aquatic animals. For example, in U.S. Pat. No. 5,144,907, the larvae are allowed to settle on the bottom of the larval tanks until they develop to spat, and then are brushed out of the larval tanks, finally are put on screen trays as their substrate. This not only complicates the settling of spat and involves intensive labor, but also disturbs the growth of the aquatic animals, because farmers have to change the substrate and brush the spat out of the larval tanks. Moreover, the bottom of the tank and the screen trays do not provide a surface area for the spat like to settle on which fully utilizes the volume of the tank. Using mesh bags filled with bare mollusk shells in a tank as substrate has similar drawbacks.

U.S. Pat. No. 4,212,268 describes an aquaculture habitat for the rearing of post-larval crustaceans in which a cellular honeycomb structure, preferably of opposed cones, provides compartments for the animals and serves as the domicile core. Individual animals are inserted into the core compartments and the core is sealed with a screen or a mesh on either side of the core. This aquaculture habit is directed to raising small crustaceans whose carnivorous nature necessitates physical separation of the animals. This habitat still does not meet the need for a low cost, durable, efficient aquaculture habitat with a substrate having a large surface for raising the aquatic animals with high yield.

Thus, it is desired to have a durable, transportable, reusable and transportable aquaculture habitat which can be deployed at sea or in land-based tanks, and which utilizes space efficiently. It is also desired to have an inexpensive and light aquaculture habit made from simple, low cost materials. It is further desired that the habitat have a modular construction, so that the scale of the operation can be easily modified. Additionally, there is a need to provide convenience for the care and protection of the cultured animals.

SUMMARY OF THE INVENTION

The aquaculture method according to the invention utilizes an aquaculture habitat constructed for the type of aquatic animal to be raised. The habitat is immersed in an aquatic environment containing larvae of aquatic animals to be raised, so that the larvae settle on the habitat, and the aquatic animals are fed until the animals grow to a desired size.

The aquaculture habitat for practicing the invention utilizes at least one habitat unit having a plurality of radially spaced concentric tubes. Many variations in the number of the tubes, the material of the tubes, the diameter and height of the tubes, and the spacing between tubes may be made in consideration of the aquaculture habitat's adaptability to the aquaculture system, e.g. land-based or offshore, and the type of animals to be raised. For example, sea urchin juveniles typically grow from a size of about <0.5 inches to maturity with a size of about 1.75–2 inches. In this case it is preferable that the radial distance between tubes more than 2 inches. The tubes are preferably made of plastic or fiberglass. Corrugated plastic drain pipe in commercially available sizes has been found to be a particularly economical and durable material for making the habitats. While these "culvert" pipes are presently only available in black, the preferred material is translucent or clear, because passage of light through the tubes facilitates photosynthesis by algae (primarily benthic diatoms) growing on the surfaces.

The tubes may be connected by bars, straps, or wires fixed to the tubes by welding, mechanical fasteners, bonding or glue. In accordance with one embodiment of the present invention, each tube in the habitat is connected by a diametric bar bonded to one axial end of each unit, and a pair of bars bonded to the other end. The perpendicular distance between the pair of bars is no less than, and preferably equal to, the width of the bar on the other end so that two habitat units can be vertically stacked in a stable way.

To enhance the larvae setting and algal feed adherence, the surfaces of the tubes may be coated with epoxy or gritted using known methods. For example, the surfaces of the tubes may be treated by a process similar with non-skid flooring. Multifaceted granules not only make an ideal juvenile and feed substrate, but also add weight which can keep the units from floating. It is also possible to utilize commercial pipes having these characteristics.

A screened cap may be employed to cover the top or the bottom of the habitat in order to protect the aquatic animals predators, especially when the aquatic animals are raised in the wild.

The aquaculture habitat can be adapted to both closed and open systems. For a closed system, a plurality of habitat units may be stacked one on top of the other in a tank designed to provide a favorable environment for the aquatic animals to be raised. Controls can be provided for the quality of the water, temperature, feed, and air for oxygenation. Filtered sea water may be used and changed regularly through a water line to the tank. Air may be supplied to the tank through an air line. To keep the water in the tank clean, a drain may be provided and suction device such as a siphon may be used to collect the debris on the tank bottom. The water temperature may also be controlled to provide a favorable environment for the aquatic animals, for example by using make-up water having a lower temperature.

In the method of culturing aquatic animals, the habitat unit may be introduced in a tank containing larvae just before the larvae are ready to settle on the substrate. For example, sea urchin larvae (with proper feed and temperature control) are usually ready to settle 30 days after gamete extraction and fertilization. The habitat unit may be therefore be inserted in a sea urchin larvae tank 28 days after the gamete extraction and fertilization. The habitat unit is preferably provided with a floral film of benthic diatoms or other microalgae and bacteria, before it is introduced in the larvae tank. It will be appreciated that any suitable feed including man-made compositions and cultured or wild algae for the aquatic animals may be employed.

The floral film may be provided on a habitat unit by immersing the habitat unit in a natural environment, i.e. a bay, until a floral film of desired density forms. Alternately, the habitat unit may be immersed in a natural environment only for inoculation with a film of diatoms, whereupon it is moved to a tank where the light, temperature and nutrient input can be controlled for optimum growth rate. A preferred nutrient combination is the commercially available F/2 nutrient media for growing microalgae. According to this method it is possible to load the larvae into the tank after the floral film is fully developed on the habitat unit.

Since the number of larvae in the tank may exceed the corresponding number of adult sea urchins which can be supported by the habitat, it may become necessary to move the habitat units from tank to tank during the growing stage. That is, when overcrowding on the growing surfaces occurs, some of the urchins will fall off and attach themselves to the bottom or sides of the tank. At this point the loaded habitat can be transferred to another tank, and can be replaced by a vacant habitat having surfaces pre-conditioned with algae in order to encourage the urchins to affix themselves. The portability of the units becomes important at this stage, particularly with regard to handling a habitat unit which is loaded with urchins, vastly increasing the weight. Thus, the modular construction provides an important advantage over a habitat constructed as a single set of concentric tubes.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
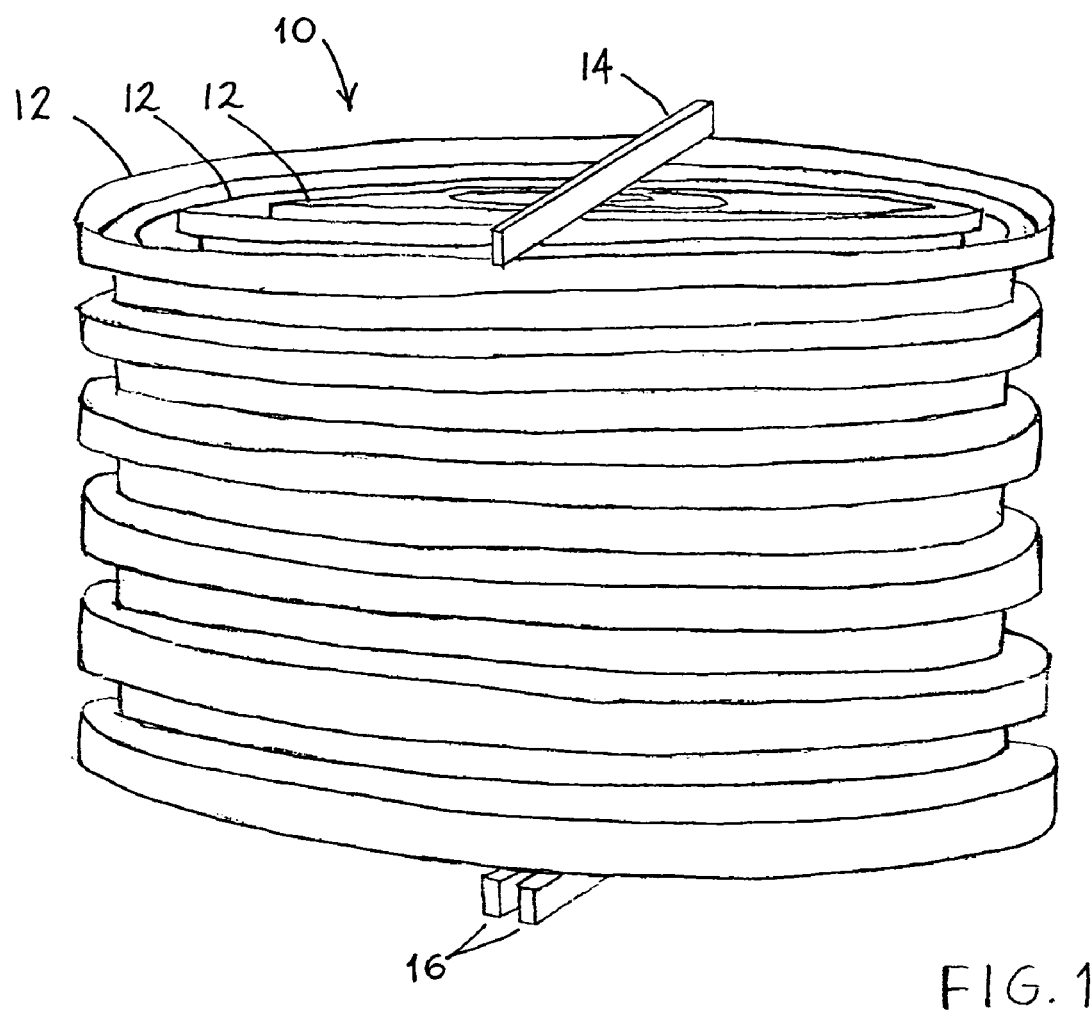
FIG. 1 is a perspective view of an aquaculture habitat used in the method of the invention.

FIG. 1 shows a habitat unit 10 with five concentric single-wall corrugated plastic tubes 12 with slots, as is used in drainage pipe. A bar 14 connecting the tubes 12 is fixed diametrically across one end of the unit. A pair of parallel bars 16 connecting the tubes 12 is fixed across the other end. These two parallel bars are spaced at a perpendicular distance equal to the width of the bar 14.

The habitat unit is conveniently designed using tubes having diameters of 4", 8", 12", 18", and 24", which are commercially available as corrugated plastic drainage pipe. This provides a space of 2" or 3" between adjacent tubes, and a large overall surface area. For sections of tube having an axial length of 20", the ten growing surfaces will have a total area of 57.5 square feet, not counting corrugations. Theoretically, this habitat unit has the capacity to raise 1437 2" sea urchins or 2070 1.75" sea urchins. If four sections having diameters of 4", 8", 12", and 18" and a height of 16" are used, the total surface area will be about 32 square feet. This may be preferable to reduce the handling weight of a habitat unit loaded with mature sea urchins.

Figure 2:
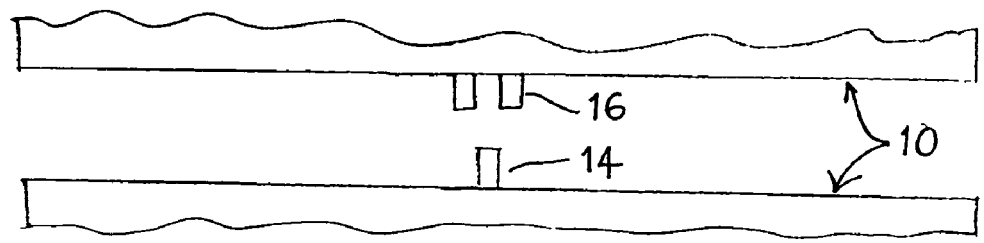
FIG. 2 is a partial side view of two identical aquaculture habitat units the showing the features which permit assembly as modules.

FIG. 2 shows the interlocking and stacking ability of two identical habitat units as described in FIG. 1.

Figure 3:
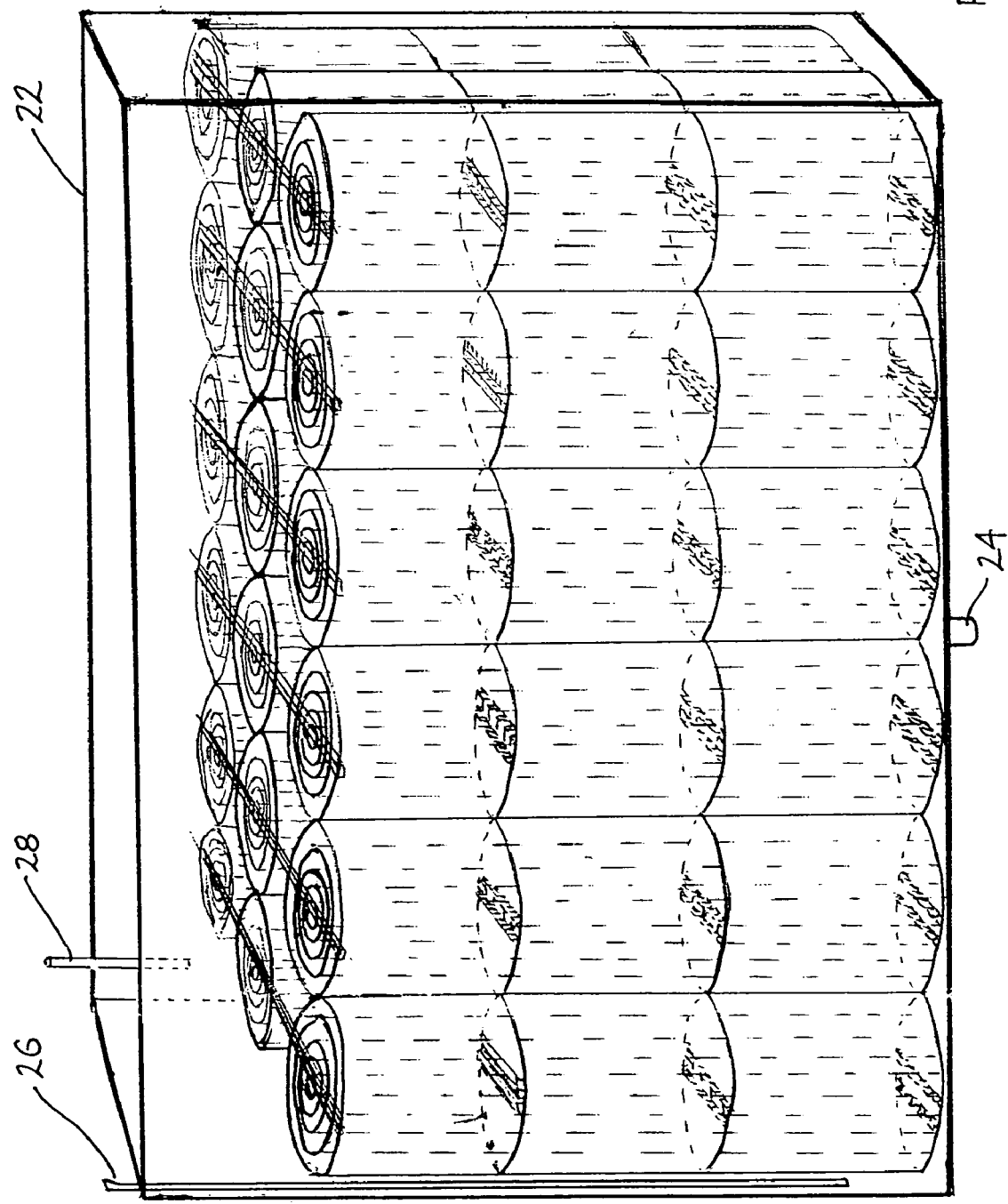
FIG. 3 is a perspective view showing a plurality of modular habitat units in a tank.

FIG. 3 shows a plurality of habitat units 10 in the same tank 22. A drain 24 is located at the bottom of the tank. An air supply line 26 and a water supply line 28 are also inserted into the tank. If the tank 22 has dimensions of 5.6 high×6.6 wide×13 long feet, the tank would house 54 habit units with 24" outer tubes.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of raising aquatic animals comprising:
   providing a habitat comprising at least one habitat unit, each said habitat unit comprising a plurality of concentric tubes having a fixed radial spacing;
   immersing the habitat in a tank containing larvae of aquatic animals to be raised so that the larvae settle on the habitat; and
   moving the habitat from the tank to an open aquatic system after the larvae have settled on the habitat.

2. A method as in claim 1 further comprising, prior to immersing the habitat in the tank containing larvae, immersing the habitat in a benthic diatom solution for a preselected time so that a desired amount of diatoms settle on the habitat.

3. A method as in claim 1 wherein the step of feeding comprises feeding wild algae to the aquatic animals.

4. A method as in claim 1 wherein said habitat comprises a plurality of said habitat units, said habitat units being substantially identical and constructed as modules which can be fit together axially.

5. A method as in claim 4 wherein each said habitat unit comprises a rod extending diametrically across one end of the tubes and a pair of parallel rods extending across the other end of the tubes, the pair of parallel rods being spaced to receive the diametrically extending rod of another habitat unit therebetween.

6. A method as in claim 1 wherein the tank comprises at least one drain for cleaning, at least one air supply line for oxygenation, and at least one water supply line.

7. A method as in claim 6 wherein the tank further comprises a suction device having a suction line in the tank.

8. A method as in claim 1 further comprising circulating seawater through said tank.

9. A method as in claim 1 further comprising producing the larvae by fertilizing and spawning at 45–50 degrees F.

10. A method as in claim 9 further comprising allowing the larvae to develop at 45–50 degrees F. prior to immersing the habitat in the environment.

11. A method as in claim 1 wherein said tubes are corrugated drain pipe.

12. A method as in claim 1 wherein said tubes in each said habitat unit are spaced apart radially by at least two inches.

13. A method as in claim 1 wherein the concentric tubes are made of transparent or translucent material.

14. A method as in claim 1 further comprising feeding the aquatic animals until the animals grow to a desired size.

15. A method of raising aquatic animals comprising:
    providing a habitat comprising at least one habitat unit, each said habitat unit comprising a plurality of concentric tubes having a fixed radial spacing, said tubes comprising corrugated drain pipe;
    immersing the habitat in an aquatic environment containing larvae of aquatic animals to be raised so that the larvae settle on the habitat;
    feeding the aquatic animals until the animals grow to a desired size; and
    moving the habitat from the aquatic environment to an open aquatic system after the larvae have settled on the habitat.

16. A method as in claim 15 wherein the aquatic environment comprises a tank.

17. A method as in claim 15 wherein said tubes in each said at least one habitat unit are spaced apart radially by at least two inches.

* * * * *